United States Patent Office 3,342,734
Patented Sept. 19, 1967

3,342,734
PHOSPHOROUS-CONTAINING GRAFT COPOLY-
MERS AS DISPERSANTS IN LUBRICATING
AND FUEL COMPOSITIONS
La Verne N. Bauer, Cheltenham, Pa., assignor to Rohm
& Haas Company, Philadelphia, Pa., a corporation of
Delaware
No Drawing. Original application Nov. 22, 1961, Ser. No.
154,351, now Patent No. 3,281,500, dated Oct. 25,
1966. Divided and this application Mar. 16, 1966, Ser.
No. 534,643
8 Claims. (Cl. 252—46.6)

This application is a division of application Ser. No. 154,351, filed November 22, 1961, now Patent No. 3,281,500.

This invention deals with lubricating and fuel compositions. It further deals with compositions containing specific products that supply principal dispersant and detergent activity. The lubricating compositions of this invention are characterized by enhanced values in dispersancy, detergency, anti-wear, viscosity and viscosity index.

Use of polymers from polymerizable esters in lubricating compositions is common practice. Polymers from alkyl acrylates and methacrylates have been prepared to supply pour depressing action and/or improved temperature-viscosity relationships. These polymers have been modified by introduction of polar groups to impart dispersing action, as by use of polymerizable nitrogenous compounds. Copolymers formed from such polymerizable esters and polymerizable phosphorus-containing esters by usual methods of polymerization, however, have not proved useful as dispersants. Some copolymers prepared from a mixture of monomers which include phosphorus-containing monomers have at times exhibited some undesirable properties such as a tendency to form gels. Although much research has been done, it has appeared from this prior work that phosphorus-containing copolymers would not be effective for imparting detergent-dispersant properties to copolymers. Yet, this present discovery demonstrates that these properties can be imparted. By following the teachings of this invention, it now becomes possible to prepare stable products, principally copolymers utilizing phosphorus-containing polymerizable esters, which products possess dispersing properties in oils and exhibit anti-wear properties. Along with these properties, there can be developed pour depressing action and capacity for improving viscosity index of lubricants.

The method for preparing the products used in the formulation of this invention comprises first initiating free radical polymerization to a base polymer of at least one free radically polymerizable monovinylidene monomer, that is, a compound having a $CH_2=C=$ group, especially a long chained ester of acrylic, methacrylic, or itaconic acid, until about 40% to about 90% of monomer used to form base polymer has been polymerized, whereby a polymerizing mixture containing polymer is obtained, and adding to this polymerizing mixture and therewith copolymerizing an acrylic ester having a substituent containing phosphorus, said ester being supplied in an amount between about 3% and 35% of the total weight of monomers used to form final copolymer. If desired, the phosphorus-containing acrylic ester may be added in admixture with at least one other polymerizable monoethylenically unsaturated monomer.

The acrylic esters containing phosphorus are selected from at least one member of the class consisting of (I) phosphono compounds of the formula

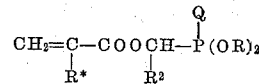

(II) phosphata compounds of the formula

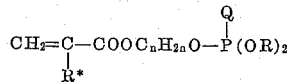

(III) phosphito compounds of the formula

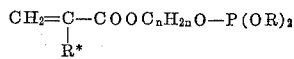

wherein R* represents hydrogen or the methyl group,
$R^2$ represents hydrogen or an alkyl group of 1 to 7 carbon atoms,
R represents an alkyl group of 1 to 8 carbon atoms,
n represents an integer, preferably from 2 to 4, but may be from 2 to 6, and
Q represents oxygen or sulfur.

It should be noted in connection with the above formulas that sulfur can be used in place of oxygen to give similar monomers. Preparation of thiolacrylates can be carried out by the method of United States Patent No. 2,977,382, wherein the compound $(RO)_2PSSNa$, is reacted with an acyl halide to give (IV)

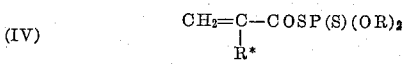

R being an alkyl group from methyl to octyl, as before, and R* hydrogen or methyl.

Preparation of phosphono, phosphato and phosphito esters with acrylic groups is described in United States Patents Nos. 2,934,555, 2,993,033 and 2,934,554, respectively. The methods of United States Patent No. 2,791,574 may also be utilized and, as shown in this patent, halogens can be present in substituent groups. Sulfur can be introduced into compounds of these types by known ways. The thionophosphonates are derivable by the reaction, for example,

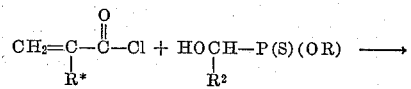

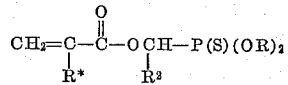

Typical compounds include
(I) dimethylphosphonomethyl acrylate or methacrylate, diethylphosphonomethyl acrylate or methacrylate, 1-diethylphosphonoethyl acrylate or methacrylate, 1-diethylphosphonopropyl acrylate or methacrylate, 1-dibutylphosphonoethyl acrylate or methacrylate, 1-di(2-ethylhexyl)phosphonoethyl acrylate or methacrylate, dioctylphosphonomethyl methacrylate, diethylthionophosphonomethyl acrylate or methacrylate, 1-diethylthiophosphonoisobutyl acrylate or methacrylate,
(II) diethylphosphatoethyl acrylate or methacrylate, dimethylphosphatoethyl acrylate or methacrylate, dibutylphosphatoethyl methacrylate, dibutylphosphatopropyl methacrylate, 2-di(2-ethylhexyl)phosphatopropyl methacrylate, 3-diethylphosphato-2-chloropropyl methacrylate, (III) dimethylphosphitoethyl acrylate or methacrylate, diethylphosphitoethyl acrylate or methacrylate, dibutylphosphitoethyl acrylate or methacrylate, dioctylphosphitoethyl acrylate or methacrylate, diisopropylphosphitoethyl acrylate or methacrylate, 2-dimethylphosphitopropyl acrylate or methacrylate, 2-diethylphosphitobutyl acrylate or methacrylate, 3-diethylphosphitobutyl methacrylate, 4-diethylphosphitobutyl methacrylate, 5 - diethylphosphitopentyl methacrylate, 6-diethylphosphitohexyl methacrylate, and (IV) S-methacryloyl diethylphosphorodithioate, S-acryloyl dimethylphosphorodithioate and S-methacryloyl dioctylphosphorodithioate.

The first polymer or base polymer may be a homopolymer or a copolymer. The chief starting materials for forming the base polymer comprise polymerizable esters of acrylic, methacrylic and itaconic acids or vinyl carboxylates or mixtures of such esters or mixtures of one or more such esters with one or more other polymerizable monoethylenically unsaturated compounds. Monomer or monomers for forming the base polymer need have a hydrocarbon group or groups which have sufficient size to ensure solubility of the final copolymer in the oil to be treated therewith. In addition to these long-chained starting monomers, there may be used in minor proportion one or more other types of monomers, including allyl esters of monocarboxylic acids, olefins, vinyl alkyl ethers, vinyl thioethers, vinyl lactams, vinyl oxazolidinones, vinyl pyridines, styrene and alkylstyrenes, esters of maleic or fumaric acid or maleic anhydride which by themselves do not provide base polymers of adequate molecular size or sufficient oil-solubility, but which can be used as conomomers along with more active or more oil-soluble monomers.

The most important group of starting monomers comprises acrylic esters. There are readily available alkyl acrylates and methacrylates having alkyl groups from methyl through octadecyl and even larger, in particular those with 20 to 24 carbon atoms. An average size of alkyl groups is used to ensure solubility of the final copolymer in the oil or fuel in which it is to be used at the desired concentration. An average of 8 carbon atoms in the alkyl portion ensures the desired solubility.

Typical esters which promote oil-solubility include octyl, nonyl, decyl, dodecyl, tetradecyl, hexadecyl, octadecyl, eicosyl and tetracosyl acrylates and methacrylates. Yet esters with smaller alkyl groups may also be used in minor proportions. These include methyl, ethyl, propyl, isopropyl, butyl, amyl, hexyl, and heptyl acrylates and methacrylates. In the same way, ester-forming groups having a cycle may find use, as in benzyl, cyclopentyl, cyclohexyl, dicyclopentyl, phenyl or alkylphenyl acrylates or methacrylates. Any of the above alcohol residues may be used for forming esters of itaconic, fumaric and the like acids.

Similarly, in the formation of the base polymer, there may be used in minor proportion at least one other polymerizable ester in which the alcohol residue (the non-hydroxyl portion of a monohydric alcohol) contains at least one hetero- atom, including chlorine, bromine, oxygen, sulfur, nitrogen or even phosphorus. Typical groups of this sort are methoxyethyl, ethoxyethyl, butoxypropyl butoxybutyl, phenoxyethyl, octylphenoxyethyl, butoxyethoxyethyl, butylphenoxyethoxyethyl, octylphenoxyethoxyethyl, cyclohexoxypropyl, benzoxyethyl, tetrafurfuryl, methylthiomethyl, ethylthioethyl, octylthioethyl, nonylthiopropyl, tetradecylthioethyl, dodecylthioethoxyethyl, 2-(ethylsulfinyl)ethyl, butylsulfinylethyl, dodecylsulfinylethyl, phenylsulfinylmethyl, benzylsulfinylethyl, dimethylaminoethyl, dibutylaminoethyl, tert-butylaminoethyl, tert-octylaminoethyl, dimethylaminoethoxyethyl, $\beta$ - chloropropyl, $\beta$-bromoethyl, diethylphosphitoethyl or diethylphosphonomethyl or diethylphosphatoethyl.

In place of these acrylic esters, there may be used similar esters of itaconic or fumaric acids, the alcohol residues being chosen from any of those shown above.

In addition to one or more acrylic esters or itaconic esters, or in place thereof, or especially in conjunction with less readily polymerizable monomers, particularly those from maleic or fumaric acids or maleic anhydride, there may be used vinyl esters of monocarboxylic acids, especially the saturated aliphatic acids of up to about 18 carbon atoms. Oil solubility is again controlled through the size of the hydrocarbon portion, here of the acid residue and in general this should have an average of at least 8 carbon atoms to supply this properly. The carboxylate group may thus vary from that of vinyl acetate upward through vinyl stearate to larger vinyl esters. Of course, the vinyl carboxylates may be used as comonomers in conjunction with acrylic esters or itaconic esters.

Along with one or more of the starting monomers selected to provide oil-solubility for the final copolymer, there may also be used in minor proportion other polymerizable monovinylidene compounds, such as acrylic, methacrylic, or itaconic acid, maleic anhydride, half esters of maleic, fumaric, and itaconic acids and a monohydric alcohol supplying an alkyl group, for example, a methyl, ethyl, butyl, octyl, isodecyl, lauryl group, a cyclohexyl group, or a benzyl group, comparable diesters of maleic or fumaric acids, half amides of the polymerizable dicarboxylic acids with an N-substituent, such as an alkyl group of 1 to 12 carbon atoms, a phenyl group, a benzyl group, or a cyclohexyl group and N-substituted acrylamides, methacrylamides and N-substituted methacrylamides, acrylonitrile methacrylonitrile, vinyl ethers, vinyl thioethers, vinyl ketones, vinyl chloride or vinylidene chloride.

Some typical vinyl ethers are vinyl butyl ether, vinyl octyl ether, vinyl dodecyl ether, vinyl hydroxyethyl thioether, vinyl tetradecyl thioether, vinyl phenyl ether or thioether, vinyl cyclohexyl ether and vinyl benzyl ether. Whereas such ethers do not polymerize well by themselves by free radical initiation, they can be copolymerized with more active vinylidene compounds.

Typical substituted amides include N-methyl-, N-octyl-, N-dodecyl-, N-cyclohexyl, N-phenyl-, N,N-dimethyl-, N,N-dibutyl-, N-methyl-N-benzyl- and N-butoxymethyl acrylamides, methacrylamides and itaconamides.

These other polymerizable monomers may be admixed with the starting ester or esters or they may be mixed with the phosphorus-containing acrylic and thus supplied to the polymerizing mixture of base polymer. As has been stated, these other or auxiliary comonomers are used in minor proportion. The maximum amount will be limited by the requirement that the final copolymer be soluble in a mineral oil, synthetic lubricant or fuel base. Usually from 5% to 30% of such other monomer or monomers may be used to serve as extender or modifier. Many of these auxiliary comonomers supply new properties or variations in properties of the final copolymers.

To prepare the present products which are principally copolymers, a monomer or a plurality of monomers is treated with a free radical initiator. This may be an organic peroxide, an azo catalyst or a hydroperoxide, the later especially in conjunction with a quaternary ammonium compound as activator. The polymerization may be effected in bulk or in an inert organic solvent in which polymer is soluble. Use of a solvent decreases the viscosity of the mixture and permits more efficient mixing.

Suitable solvents include, among others, aromatic hydrocarbons, such as benzene, toluene, xylene and aromatic naphthas, chlorinated hydrocarbons, such as ethylene dichloride, esters, such as butyl acetate or ethyl propionate and also petroleum oils which are pure enough so as not to interfere with polymerization. Solvent may be retained with the final polymer or volatile solvents may be stripped off. When the copolymer is to be used in a lubricating oil, it is generally desirable to displace from the final polymer volatile solvent used with a good quality oil, such as 100 or 150 neutral oil, to give a solution of copolymer in oil. If the copolymer is to be used in a synthetic lubricant, the volatile solvent may be displaced with a liquid of the type to be used in the lubricant as dioctyl sebacate, dibutylphenyl phosphate, a silicate ester, or a silicone fluid.

The starting monomer or mixture of monomers is heated with initiator between about 60° and 160° C., depending in part upon choice of initiator. Polymerization may be started at one temperature and continued at other temperatures. Increments of initiator or initiator and activator may be added from time to time and different initiators may be used at different stages of polymerization. Solvent or solvents may be added or removed during the process. The entire charge of monomer to form base polymer may be present at the start or monomer may be supplied as polymerization proceeds.

As initiator, there is preferably used at least one organic hydroperoxide, such as tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide and other tert-alkyl hydroperoxides, hydrocarbon substituted benzene hydroperoxides and terpene hydroperoxides. The whole charge of hydroperoxide or hydroperoxides may be used at the start or increments may be supplied as polymerization proceeds and in the several stages of polymerization.

Hydroperoxides may be rendered active at lower temperatures by use of an activator. Especially effective activators are quaternary ammonium compounds, such as benzyltrimethylammonium chloride, dibenzyldimethylammonium bromide, butyldimethylbenzylammonium chloride, octyltrimethylammonium chloride, dodecyldimethylbenzylammonium chloride, nonylbenzyltrimethylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, nonylphenoxyethoxyethyltrimethylammonium bromide, diisobutylphenoxyethoxyethyldimethylbenzylammonium chloride, cetylpyridinium chloride, N - octyl - N - methylmorpholinium chloride and bis-quaternary salts, such as those having quaternary nitrogens linked with an alkylene group, an amide-containing group or hydrocarbon group interrupted with ether oxygen.

In place of the preferred hydroperoxide initiator system, there may be used other free radical polymerization initiators. A sub-class of interest comprises peroxides, such as benzoyl peroxide, acetyl peroxide, caproyl peroxide, lauroyl peroxide, di-tert-butyl perphthalate, tert-butyl perbenzoate, 2,2-bis(tert-butylperoxy)butane and methyl ethyl ketone peroxide. There may, likewise, be used an azo catalyst, such as azodiisobutyronitrile, azobisdimethylvaleronitrile, azodiisobutyramide, dimethyl azodiisobutyrate, azobis(α-ethylbutyronitrile) or azobis( α,β-dimethylcapronitrile). In an effective variation of the method for the preparation of copolymers of this invention, a peroxide or an azo catalyst is used in forming the base polymer and a hydroperoxide, preferably in conjunction with a quaternary ammonium compound, is used in the second stage.

The amount of initiator or initiators should be between 0.01% and about 5% of the weight of comonomers. In the first stage wherein base polymer is formed, it is preferred to use about 0.05% to about 2.5% of the weight of the monomer or monomers there used, unless it is desired to produce polymer of low molecular weight, in which case up to 5% or even more may be desired. In the second stage wherein a phosphorus-containing acrylic ester is copolymerized, it is usual to supply about 0.1% to about 1% of catalyst, preferably hydroperoxide; but, as noted, sufficient catalyst or catalysts may be provided at the start to last through the process.

When an activator is used, it is proportioned in general to the amount of hydroperoxide. It will usually amount to 5% to 40% of the weight of the hydroperoxide.

When in the first stage, the monomer or monomers have been polymerized to an extent of at least about 40% up to 90% (by weight), addition of polymerizable phosphorus-containing acrylic ester is made. Addition may be made in one lot or in increments. At this stage, additional polymerization initiator may be supplied to develop final copolymers with optimum dispersing activities.

Monomer can be added to base polymer directly or it can be added in admixture with the phosphorus-containing acrylic ester.

Extent of initial polymerization may conveniently be determined by such a simple method as volatilization of monomer and solvent and estimation of residue. Extent of polymerization may also be determined by precipitation in a liquid which is a non-solvent for the polymer. Estimation of extent of formation of base polymer under a given set of conditions permits establishing a standard procedure as to proportions of initiator, concentrations, temperatures and times to ensure regularly obtaining products with well developed dispersing action.

After final copolymer has been formed subsequent to adding one or more polymerizable phosphorus-containing acrylic esters to the base polymer and monomer or monomers, the final copolymer may be isolated, if so desired, by stripping off volatile material, including solvent and preferably residual monomer, by heating, preferably under reduced pressure, or by precipitating the final copolymer with an organic solvent which is a non-solvent for the copolymer.

It is usually more expedient to take up the final copolymer in a liquid such as a petroleum oil, a synthetic lubricant or a fuel and prepare a concentrate containing 20% to 50% of copolymer. Volatile solvent and/or monomer may be volatilized, if desired, from the mixture of copolymer and oil, synthetic lubricant or fuel. The concentrate is convenient for handling, stripping and blending.

If the copolymer is prepared in a volatile solvent, it is readily transferred to an oil or a relatively non-volatile ester by mixing the solution of copolymer in volatile solvent and oil or ester and distilling the volatile material from the mixture. The mixture may be heated between 100° and 160° C., desirably under reduced pressure, conveniently at 5 to 30 mm. (Hg) pressure, to ensure complete removal of volatiles. During the heating of the mixture, any remaining traces of initiator are decomposed.

Copolymers may be prepared over a wide range of molecular weights by known variations in such factors as monomers, solvent concentrations, temperature, time and catalysts and their proportions. Molecular weights determined by viscosity methods have been varied from about 20,000 to over 2,000,000. Low molecular weights are especially desirable when polymers are to be rather resistant to shear. High molecular weights are desirable when maximum thickening and optimum properties are required. The final products that are incorporated in the oil or fuel may contain, in addition to the desired copolymers, homopolymers and unreacted monomers. The term "product" is used in this application in the sense that at least copolymers are present and possibly homopolymers and unreacted monomers. This is satisfactory for the formulations of this invention.

Products of this invention provide improvements in the viscosity-temperature relationship of lubricants containing them. The extent of the improvement will depend in part upon the choice of comonomers and in part upon the type and size of copolymer formed. The optimum combination of monomers depends upon the particular liquid to be treated. For instance, for a heavy oil, it is generally desirable to use some relatively large hydrocarbon substituent together with somewhat smaller substituents. This principle can also be used for developing good pour point depressing action.

An effect peculiar to presence of phosphorus-containing groups is development of anti-wear properties. These properties can be somewhat further increased by the presence of some forms of sulfur. An estimate of anti-wear properties can be made with the aid of Shell Four-Ball Wear Tester, in which one ball is rotated at 75° C. under a determined load in a chuck against a pocket of three stationary balls with the contact surfaces submerged in the lubricant composition under test. Scars developed on the three balls are measured under a microscope in millimeters. In general, smaller scars indicate less wear.

Tests were made in a base oil (a 170 SUS solvent extracted mid-continent neutral) which gave scar diameters of 0.62 mm. at 10 Kg. load and 0.83 at 40 Kg. load. This oil with 0.15% of tricresyl phosphate gave values of 0.40 and 0.78, respectively, at these same loads.

A blend of base oil with 1% of a product prepared from 80 parts of lauryl-myristyl methacrylate and 10 parts of delta-chlorobutyl methacrylate with catalyzed delayed addition of 10 parts of diethylphosphatoethyl methacrylate gave scars of 0.34 and 0.62 mm., respectively.

A blend of base oil with about 1% of a product prepared from 95 parts of poly(lauryl-myristyl methacrylate) and 5 parts of diethylphosphatoethyl methacrylate gave scars of 0.26 and 0.52 mm., respectively.

A blend of base oil with about 1% of a product from 90 parts of a copolymer from 90 parts of lauryl-myristyl methacrylate and 5 parts of methoxypolyethoxyethyl methacrylate having about 30 ether groups with 5 parts of diethylphosphatoethyl methacrylate supplied to the polymerizing mixture gave scars of 0.23 and 0.53 mm., respectively.

A blend of base oil and about 1% of a product prepared from 75 parts of lauryl-myristyl methacrylate and 10 parts of ethylsulfinylethyl methacrylate with 1.5 parts of diethyl phosphatoethyl methacrylate and 7.5 parts of diethyl phosphonoethyl methacrylate gave scars of 0.23 and 0.40 mm., respectively.

A blend of base oil and about 2% of a product formed as described above from 80 parts of lauryl-myristyl methacrylate and 20 parts of diethylphosphonothionoethyl methacrylate gave scars averaging 0.28 and 0.50 mm., respectively.

A blend of base oil and about 1% of a product from 90.6 parts of lauryl-myristyl methacrylate and 9.4 parts of diethylphosphitoethyl methacrylate as made by the process of this invention gave scars of 0.26 and 0.54 mm., respectively.

A blend was prepared in base oil with 0.5% of sulfurized sperm oil and 1% of a product based on 60 parts of cetyl-stearyl methacrylate, 20 parts of lauryl methacrylate, 10 parts of butyl methacrylate and 10 parts of dibutylphosphonomethyl methacrylate. It was tested only under a load of 40 kg. and gave a scar of 0.43 mm. diameter.

Improvements in viscosity-temperature relationships are regularly obtained although the extent varies with the choice of comonomers for forming the copolymers and their molecular size. Many of the copolymers also provide depression of pour points of lubricants. This action is more readily attained with copolymers of this invention than, for example, with copolymers based only on alkyl esters of unsaturated acids. Here, the presence of groups as large as dodecyl together with the phosphorus-containing groups gives pour depressing action. Some typical data on viscosity index and pour point depression follow:

A product was prepared starting with 80 parts of lauryl-myristyl methacrylate and a hydroperoxide-quaternary ammonium salt initiator and adding 20 parts of diethylphosphonoethyl methacrylate. A 2% solution of this copolymer was made in oil identified as PL–1651 oil. This solution had viscosities of 6.58 cs. at 100° F. and 42.67 cs. at 210° F., giving a viscosity index of 121. The ASTM pour point of this solution was −15° F. The PL–1651 oil itself gives viscosities of 5.38 cs. at 100° F. and 34.15 cs. at 210° F., corresponding to a viscosity index of 100. It has a pour point of 0° F.

Another product was similarly made starting from 75 parts of lauryl-myristyl methacrylate and 10 parts of ethylsulfinylethyl methacrylate with a hydroperoxide-quaternary ammonium salt initiator and adding 15 parts of diethylphosphonoethyl methacrylate. A solution of 2.67% of this product in PL–1651 oil had viscosities of 7.94 cs. at 100° F. and 42.67 cs. at 210° F., corresponding to a viscosity index of 146. This solution had a pour point (ASTM) of −15° F.

A product similarly prepared from 75 parts of lauryl-myristyl methacrylate, 10 parts of ethylsulfinylethyl methacrylate, and 15 parts of diethylphosphatoethyl methacrylate was dissolved at 2.83% in PL–1651 oil. Viscosities of this solution were 7.47 cs. at 100° F. and 41.93 cs. at 210° F., giving a viscosity index of 140. The pour point was −25° F.

Another product was made in the same way with a hydroperoxide-quaternary ammonium salt initiator starting with 75 parts of lauryl-myristyl methacrylate and adding 25 parts of diethylphosphatomethyl methacrylate. A 2.36% solution of this copolymer in PL–1651 had viscosities of 8.36 cs. at 100° F. and 47.14 cs. at 210° F., corresponding to a viscosity index of 142.

Evaluations were also made in an SAE-30 oil having viscosities of 12.47 cs. at 100° F. and 128 cs. at 210° F., corresponding to a viscosity index of 96. This oil contained an anti-oxidant and a heavy duty detergent, a basic dioctylphenolsulfide.

A product was prepared starting with 75 parts of lauryl-myristyl methacrylate with tert-butyl hydroperoxide as initiator and adding 25 parts of diethylphosphonoethyl methacrylate. A 2.5% solution of this copolymer in the above oil had viscosities of 8.66 cs. at 100° F. and 196.4 cs. at 210° F., giving a viscosity of 111.

As has been indicated above, the products of this invention may be used in conjunction with other additives for lubricating compositions. These include anti-oxidants, stabilizers, high temperature detergents, other low temperature dispersants, other pour point depressants, other viscosity index improvers, anti-squawk agents, extreme pressure agents, foam suppressors and corrosion inhibitors, anti-wear agents, oiliness agents and other types of oil additives. These include such materials as 4,4'-methylene-bis-2,6-di-tert-butylphenol, trialkylphenols, as 2,6-di-tert-butylcresol, tris(dimethylaminomethyl)phenol, phenothiazine, phenyl-α-naphthylamine, phenyl-β-naphthylamine, zinc dialkyl dithiophosphates, zinc dicyclohexyl dithiophosphate, zinc diphenyl dithiophosphates, barium dialkyl dithiophosphate, nickel dialkyl dithiophosphate, calcium, strontium or barium petroleum sulfonates, including both normal and basic, alkaline earth alkylbenzene sulfonates and alkylnaphthalene sulfonates, alkaline earth alkylphenates, particularly with excess alkaline earth and such basic phenates which have been carbonated, alkaline earth metal alkylsalicylates, normal or basic aluminum naphthenates, calcium phenylstearates, alkaline earth metal salts of diphenol sulfides, alkaline earth salts of alkylated phenols and alkyl-phenol-formaldehyde condensates, tricresyl phosphate, chloroalkyl phosphates and phosphites, silicones, such as polymethylsiloxanes, octylphenoxyethoxyethoxyethanol nonylphenoxypolyethoxyethanol, alkenylsuccinic anhydride, sulfurized sperm oil, sulfurized terpenes, polyisobutylene, copolymers of cetyl, lauryl and butylmethacrylates, copolymers of dilauryl fumarate and vinyl acetate, copolymers of dodecyl acrylate and N-vinyl-2-pyrrolidinone, copolymers of lauryl-myristyl methacrylate and 2-methyl-5-vinylpyridine, copolymers of cetyl methacrylate and alkoxypolyethoxyethylmethacrylate or tert-alkylamines, these being typical of the various types of additives.

It is standard practice to use various types of additives in a lubricating oil. Typical formulations follow:

(A) 2% of a copolymer from 90 parts of lauryl-myristyl methacrylate and 10 parts of diethylphosphatoethyl methacrylate, 1% of a copolymer of 90% of stearyl methacrylate, lauryl methacrylate and butyl methacrylate with 10% of N-vinyl-2-pyrrolidinone, 2% of a basic calcium petroleum sulfonate and 1% of zinc dialkyl dithiophosphate, all dissolved in a neutral oil;

(B) the composition of (A) to which is added 0.2% of octylphenoxyethoxyethoxyethanol;

(C) a lubricating oil containing 3% of copolymer from 75 parts of mixed alkyl methacrylates having 12 to 18 carbon atoms in the alkyl portion and 25 parts of dipropylphosphonomethyl methacrylate, 3% of a basic calcium phenate based on a diisobutylphenol-formaldehyde condensate and 1% of 4,4'-methylene-bis-2,6-di-tert-butylphenol;

(D) a lubricating oil containing 1.75% of a copolymer of stearyl, lauryl and methyl methacrylate and dimethylaminoethyl acrylate, 1.5% of a copolymer of 75 parts of long-chained alkyl methacrylates, 10 parts of butylsulfinylethyl acrylate and 15 parts of dipropylphosphatoethyl methacrylate and 1% of zinc dialkyldithiophosphate;

(E) a lubricating oil containing 1.5% of a copolymer from long-chained alkyl acrylates and 2-methyl-5-vinylpyridine, 2% of a copolymer from mixed alkyl methacrylates, styrene and diethylphosphatopropyl methacrylate and 1% of methylenebis-2,6-di-tert-butylphenol and (F) oil-containing 2% of a copolymer of long-chained alkyl methacrylates, methyl acrylate and diethylphosphatopropyl methacrylate (at 15%), 0.5% of a pour depressing copolymer of stearyl, lauryl and octyl methacrylates, 1% of polyisobutylene and 1% of zinc dialkyl dithiophosphate. To any of these compositions there may be added a trace of a polymethylsiloxane anti-forming agent, usually in an amount from 0.0001 to 0.001%.

The fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 cs. at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as SAE 5 to SAE 50. Other types of lubricants are also included, such as hydraulic and automatic transmission fluids.

The synthetic lubricants include esters, such as dioctyl, dinonyl or isodecyl adipates, azelates or sebacates, polyethers and silicons. When use as hydraulic fluids is contemplated, phosphate esters are included as a base.

In the present compositions, there may also be used as a base, a transmission fluid, hydraulic fluid, gear oil or grease.

There may be used from about 0.1% to 10%, preferably 0.2% to 2.0%, by weight of one or more of the present products in a lubricating composition. In a fuel composition, the useful range is 0.001% to 0.1%, preferably 0.005% to 0.05%, by weight.

Benefits from the use of products of this invention in fuel oils and gasolines are shown by such tests as the Cities Service Test (Analytical Chemistry 24, 1959 (1952)) in which oil is subjected to oxidation at 250° F. and passed through a No. 1 filter paper. Time for filtering is measured. There is a marked reduction in this time when the fuel oil under test contains a product of this invention.

Effective action of products of this invention is also demonstrated by measurements of pressure with time when samples are heated at 500° F. and circulated through a filter with a pump. Oils which permit circulation for about 75 minutes and treated with one of these products can be circulated for over 300 minutes before excessive pressures build up.

The following examples are offered by way of illustration and not by way of limitation.

EXAMPLE 1

There were mixed 40.6 parts of 98.6% pure lauryl-myristyl methacrylate, 2.5 parts of toluene and 0.2 parts of a 50% diisopropylbenzene hydroperoxide solution in alcohol and acetone. About 30% of the mixture was added to a polymerization vessel which was flushed with nitrogen and heated with an oil bath to 105° C. Time was recorded from the moment that this temperature was reached. Addition was made of 0.04 part of a butanol solution containing 25% of diisobutylphenoxyethoxyethyldimethylbenzylammonium chloride. The rest of the above mixture was run into the vessel over the next 100 minutes with the batch temperature at 111° to 116° C. It was found that about 50% of the monomer had formed polymer. There was then added over a 15-minute period a mixture of 10 parts of diethylphosphatoethyl methacrylate, 0.05 part of 50% diisopropylbenzene hydroperoxide solution and 0.05 part of 5% solution of the above quaternary chloride in butanol. Heating and stirring were continued. At intervals, there were added additional amounts of initiator and activator totaling 0.07 part of the hydroperoxide and 0.007 part of the quaternary chloride. Addition of 2.5 parts of toluene was also made. Heating was discontinued after 6.5 hours, but stirring was continued for another half hour. There resulted a solution of 41% copolymer, corresponding to a yield of 87.7%. A toluene solution adjusted to 30% of copolymer had a viscosity of 8247 cs. at 100° F.

Product was transferred to oil by mixing 43.1 parts of the toluene solution with 30 parts of 100 SUS oil and heating the mixture with stirring under reduced pressure, the mixture being heated to 100° C./10 mm. for 90 minutes.

This oil solution exhibited dispersing action against asphaltenes at 150° C., as well as 90° C., 0.25% dispersing 0.4% of asphaltenes at 150° C.

EXAMPLE 2

The above procedure was followed starting with 90 parts of cetyl-stearyl acrylate, 0.16 part of diisopropylbenzene hydroperoxide in solution and 0.02 part of octylphenoxyethyldimethylbenzylammonium chloride. After base polymer had been formed therefrom for 2 hours (about 60% conversion), there was slowly added a mixture of 10 parts of diethylphosphatoethyl acrylate, 0.05 part of 5% octylphenoxyethyldimethylbenzylammonium chloride solution and 0.05 part of 50% diisopropylbenzene hydroperoxide solution. Additions were made of initiator and activator as copolymerization proceeded over 7 hours. The final solution contained 47% of copolymer, a yield of 93%. A sample adjusted to 30% with toluene gave a viscosity of 255 cs. at 100° F. This product was a dispersant for asphaltenes in oil, 0.5% thereof dispersing 0.2% of asphaltenes at 150° C.

EXAMPLE 3

The procedure of the above examples was followed by starting with 95 parts of dodecyl methacrylate and adding 5 parts of diethylphosphatoethyl methacrylate beginning after the second hour of polymerization. There were used totals of 0.43 part of diisopropylbenzene hydroperoxide and 0.043 part of diisobutylphenoxyethoxyethyldimethylbenzylammonium chloride. The final solution contained 45.4% of copolymer in a yield of 85.5%. A 30% solution of copolymer in toluene had a viscosity of 136.8 cs. at 100° F. This product dispersed asphaltenes in oil, 0.5% of copolymer dispersing 0.2% of asphaltenes at 90° C.

EXAMPLE 4

The same procedure was followed starting with 88 parts of lauryl-myristyl methacrylate and adding 12 parts of diethylphosphitoethyl methacrylate. There were used a total of 0.45 part of diisopropylbenzene hydroperoxide and 0.045 part of diisobutylphenoxyethoxyethyldimethylbenzylammonium chloride. The product was a 37% solution of copolymer in an 81% yield. A sample adjusted to 30% of copolymer in toluene had a viscosity of 57.6 cs. at 100° F. The copolymer exhibited dispersing action, 0.5% of copolymer dispersing 0.2% of asphaltenes at 90° C.

EXAMPLE 5

The same procedure was applied to 90 parts of lauryl-myristyl methacrylate and 10 parts of diethylphosphonoethyl methacrylate with use of 0.36 part of diisopropylbenzene hydroperoxide and 0.026 part of diisobutylphenoxyethyldimethylbenzylammonium chloride. The product was a toluene solution of 34.2% of copolymer in a yield of 71.3%. A 30% solution of copolymer in toluene had a viscosity of 478 cs. at 100° F. The product dispersed asphaltenes in oil, 0.25% of copolymer dispersing 0.2% of asphaltenes at 90° C.

EXAMPLE 6

By the same procedural steps and conditions used above, there was first polymerized a mixture of 40 parts of lauryl-myristyl methacrylate and 40 parts of n-butyl methacrylate in 30 parts of dioctyl sebacate with 0.25 part of cumene hydroperoxide and 0.025 part of dodecyldimethylbenzylammonium chloride. After this mixture was polymerized for 2¼ hours, there was slowly added thereto 20 parts of diethylphosphatoethyl acrylate. Additions were made of initiator and activator to bring the totals to 0.47 and 0.047, respectively. From time to time, additional dioctyl sebacate was added to a total of 60 parts. The product was a slightly hazy solution containing 50% of copolymer in a yield of 90%.

The above procedure was repeated with use of 40 parts of lauryl-myristyl methacrylate, 30 parts of n-butyl methacrylate and 30 parts of diethylphosphatoethyl methacrylate. There was, likewise, a 90% yield of copolymer in 50% solution.

Both of these products exhibited dispersing action against asphaltenes.

EXAMPLE 7

Polymerization apparatus comprised a vessel equipped with stirrer, thermometer, condenser, inlet tube and an additional funnel and surrounded by an oil bath. The vessel was swept with nitrogen and the oil bath was heated to 118° C. There were mixed 140 parts of lauryl-myristyl methacrylate, 20 parts of 2-(ethylsulfinyl)ethyl methacrylate, 20 parts of toluene, 0.8 part of diisopropylbenzene hydroperoxide in a 50% solution and 0.08 part of diisobutyl(methyl)phenoxyethoxyethyldimethylbenzylammonium chloride in a 5% solution in butanol. This mixture was gradually run into the polymerization apparatus with the temperature maintained at 116° to 118° C. After 2.67 hours, additions were made of 0.02 part of diisopropylbenzene hydroperoxide and 0.02 part of the same quaternary salt. At 3 hours, addition (after about 80% polymerization) was begun of a mixture of 20 parts of lauryl-myristyl methacrylate, 20 parts of diethylphosphatoethyl methacrylate, 0.2 part of the same peroxide, 0.2 part of the same quarternary salt and 10 parts of toluene. Subsequent additions of toluene were made to maintain good stirring. At 7 hours, heating was discontinued. The product was 48.4% solution of copolymer, representing a yield of 75%.

This product was a dispersant, as shown by the standard asphaltenes dispersancy test at 150° C., 0.25% readily dispersing 0.4% of asphaltenes in a lubricating oil.

Copolymers were prepared from long-chained alkyl methacrylates or acrylates and various dialkylphosphonoalkyl, dialkylphosphatoalkyl and dialkylphosphitoalkyl methacrylates and acrylates which were added to base polymer by the method illustrated above with choice of various free radical catalysts, including tert-butyl perbenzoate, tert-butyl hydroperoxide, cumene hydroperoxide, azodiisobutyronitrile and diisopropylbenzene hydroperoxide in conjunction with a variety of quaternary ammonium salts. Yields of 85% to 95% of copolymer were readily attained and the copolymers exhibited marked dispersing action.

A proportion up to 35% of diethylphosphonoethyl acrylate or methacrylate gave products which were soluble even at 5% in heavy lubricating oils, whereas higher proportions caused copolymer to separate when the blend containing copolymer was stored in a refrigerator.

EXAMPLE 8

There were mixed 15.3 parts of cetyl-stearyl methacrylate, 14.2 parts of lauryl-myristyl methacrylate, 6.1 parts of n-butyl methacrylate, 2.5 parts of toluene and 0.05 part of diisopropylbenzene hydroperoxide. About a third of this mixture was run into a polymerization vessel heated at 125° C. and blanketed with nitrogen. Thereupon there was added a solution supplying 0.01 part of didodecyldimethylammonium chloride. Polymerization was continued at 120° to 130° C. with addition of the rest of the mixture. After about 2 hours, an aliquot was taken and polymer therein determined. It corresponded to 75% of the initial monomers. There was then added a mixture of 7.5 parts of dimethylphosphonomethyl methacrylate, 7.5 parts of dodecyl acrylate, 0.02 part of diisopropylbenzene hydroperoxide in a 50% solution and 0.002 part of the same quaternary ammonium salt, likewise in solution. Polymerization was continued at 117° to 125° C. for 6.5 hours. The final product was a 39% solution of copolymer.

The copolymer was transferred to a mineral oil by mixing the above solution and oil and heating and stirring the mixture at 105° C./10 mm. for 90 minutes.

In an oil blend, 0.25% of this product dispersed 0.4% of asphaltenes at 150° C.

EXAMPLE 9

The previous procedure was repeated with substitution of 9 parts of di-n-butylphosphonomethyl methacrylate for the 7.5 parts of dimethylphosphonomethyl methacrylate. The final product was a 41% solution of copolymer which, likewise, exhibited dispersing action in the standard asphaltenes tests at 150° and 90° C.

The procedure was again followed with substitution of di-n-butylphosphono-2-ethylhexyl methacrylate with a comparable result.

The procedure was again followed with substitution of di - 2 - ethylhexylphosphono - 2 - ethylhexyl methacrylate, again with a similar outcome.

EXAMPLE 10

A 500 cc. round-bottom, 3-neck flask was equipped with a gas inlet tube, a condenser, a circular-type glass stirrer and an addition funnel. The system was flushed with nitrogen and the bath surrounding the reaction vessel was maintained at an initial temperature of 107° C. A monomer mixture was prepared from 22.5 parts of lauryl-myristyl methacrylate, 3.0 parts of dilaurylmyristyl fumarate, 1.5 parts of toluene, 0.6 part of diisopropylbenzene hydroperoxide solution (50% active ingredient) and 0.6 part of diisobutylphenoxyethoxyethylbenzyldimethylammonium chloride solution (5% active ingredient). With the bath temperature at 107° C., the monomer mixture was added to the reaction flask. After a heating period of 2.0 hours, a second monomer mixture composed of 4.5 parts of diethylphosphonoethyl methacrylate, 1.5 parts of toluene, 0.1 part of a diisopropylbenzene hydroperoxide solution (50% active ingredient) and 0.1 part of a diisobutylphenoxyethoxyethylbenzyldimethylammonium chloride solution (5% active ingredient) was added to the reaction mixture. Five additions, each of 0.1 part of a diisopropylbenzene hydroperoxide solution (50% active ingredient) and 0.1 part of a diisobutylphenoxyethoxyethylbenzyldimethylammonium chloride (50% active ingredient) in from 0.5 part to 5 parts of toluene were made at 2.67, 3.33, 4.00, 4.67 and 5.33 hours. At 6.00 hours, 27 parts of toluene was added. The temperature was maintained at 103° to 112° C. throughout the poylmerization until 6.50 hours when heating was discontinued. The product was a 40.6% solution of copolymer in toluene and exhibited a viscosity of 600.3 cs. at 100° F. An oil blend containing 0.125% of this polymer dispersed 0.4% asphaltenes at 150° C.

EXAMPLE 11

In the same manner as described in Example 10, there were copolymerized 22.5 parts of lauryl-myristyl methacrylate, 4.5 parts of diethylphosphonoethyl methacrylate and 3.0 parts of styrene in 45 parts of toluene with 0.6 part of a diisopropylbenzene hydroperoxide solution (50% active ingredient) and 0.6 part of a diisobutylphenoxyethylbenzyldimethylammonium chloride solution (5% active ingredient) during 6.5 hours to give a 42.3% solution of copolymer in toluene which exhibited a viscosity of 721.6 cs. at 100° F. A blend of 0.25% of this product in oil dispersed 0.4% asphaltenes at 150° C.

EXAMPLE 12

A 500 cc. round-bottom, 3-neck flask was equipped with a gas inlet tube, a condenser, a circular-type glass stirrer and an addition funnel. The system was flushed with nitrogen and the bath surrounding the reaction vessel was maintained at an initial temperature of 110° C. A monomer mixture was prepared from 22.5 parts of lauryl-myristyl methacrylate, 3.0 parts of methoxyethoxyethyl vinyl ether, 1.5 parts of toluene and 0.12 part of dimethyl azodiisobutyrate. With the bath temperature at 110° C., the monomer mixture was added to the reaction flask with formation of base polymer in solution. After a heating period of 2.0 hours, a second monomer mixture composed of 4.5 parts of diethylphosphonoethyl methacrylate, 1.5 parts of toluene and 0.04 part of dimethyl azodiisobutyrate was added to the solution containing about 70% of base polymer. Five additions each of 0.04 part of dimethylazodiisobutyrate in 1.0 part of toluene were made at 2.67, 3.33, 4.00, 4.67 and 5.33 hours. The temperature was maintained at 102° to 112° C. throughout the polymerization until 6.5 hours when heating was discontinued. The product was a 37.1% solution of copolymer in toluene and exhibited a viscosity of 235.9 cs. at 100° F. A blend of 0.125% of this product in oil dispersed 0.4% asphaltenes at 150° C.

EXAMPLE 13

In the same manner as described in Example 12, there were copolymerized 22.5 parts of lauryl-myristyl methacrylate, 4.5 parts of diethylphosphonoethyl methacrylate and 3.0 parts of methyl methacrylate in 46.0 parts of toluene with 0.54 parts of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 39.5% solution of copolymer in toluene. One percent of this product in an oil test blend dispersed 0.4% asphaltenes at 150° C.

EXAMPLE 14

Polymerization apparatus described in Example 12 was used. The system was flushed with nitrogen and the bath surrounding the reaction vessel was maintained at an initial temperature of 117° C. A monomer mixture was prepared from 22.5 parts of lauryl-myristyl methacrylate, 3.0 parts of dimethylaminoethyl methacrylate, 1.5 parts of toluene, 0.3 part of a diisopropylbenzene hydroperoxide solution (50% active ingredient) and 0.3 part of a diisobutylphenoxyethoxyethylbenzyldimethylammonium chloride solution (5% active ingredient). With the bath temperature at 117° C., the monomer mixture was added to the reaction flask. After a heating period of 2.0 hours, during which time about 60% of the monomer had polymerized, a second monomer mixture composed of 4.5 parts of diethylphosphonoethyl methacrylate, 1.5 parts of toluene, 0.04 part of a diisopropylbenzene hydroperoxide solution (50% active ingredient) and 0.04 part of a diisobutylphenoxyethoxyethylbenzyldimethylammonium chloride solution (5% active ingredient) was added to the reaction mixture. Five additions, each of 0.04 part of a diisopropylbenzene hydroperoxide solution (50% active ingredient) and 0.04 part of a diisobutylphenoxyethoxyethylbenzyldimethylammonium chloride solution (5% active ingredient) in 5 parts of toluene, were made at 2.67, 3.33, 4.00, 4.67 and 5.33 hours. At 6.0 hours, 18 parts of toluene was added. The temperature was maintained at 103° to 117° C. throughout the polymerization until 6.5 hours when heating was discontinued. The product was a 36.1% solution of copolymer in toluene. An oil blend of 0.25% of this product dispersed 0.4% asphaltenes at 150° C.

EXAMPLE 15

In the same manner as described in Example 14, there were copolymerized 22.5 parts of lauryl-myristyl methacrylate, 4.5 parts of diethylphosphonoethyl methacrylate and 3.0 parts of N - vinyl - 2 - pyrrolidinone in 66 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 29.1% solution of copolymer in toluene which exhibited a viscosity of 1427.2 cs. at 100° F. A blend of 0.25% of this product in oil dispersed 0.4% asphaltenes at 140° C.

EXAMPLE 16

In the same manner as described in Example 14, there were copolymerized 22.5 parts of lauryl-myristyl methacrylate, 4.5 parts of diethylphosphonoethyl methacrylate and 3.0 parts of 2 - methyl - 5 - vinylpyridine in 56.0 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 32.9% solution of copolymer in toluene. A solution of 0.25% of this product in oil dispersed 0.4 asphaltenes at 150° C.

EXAMPLE 17

A polymerization system, as described above, was flushed with nitrogen and the bath surrounding the reaction vessel was maintained at an initial temperature of 119° C. A monomer mixture was prepared from 75.0 parts of lauryl-myristyl methacrylate, 5.0 parts of oil, 0.4 part of a diisoproplybenzene hydroperoxide solution (50% active ingredient), and 0.4 part of a diisobutylphenoxyethoxyethylbenzyldimethylammonium chloride solution (5% active ingredient). With the bath temperature at 119° C., 30% of the monomer mixture was added to the flask. After a heating period of 0.33 hour, the remainder of the monomer mixture was added uniformly over 1.33 hours. After a total heating period of 2.0 hours, a second monomer mixture composed of 25.0 parts of diethylphosphonoethyl methacrylate, 5.0 parts of oil, 0.2 part of a diisopropylbenzene hydroperoxide solution (50% active ingredient), 0.2 part of a diisobutylphenoxyethoxyethylbenzyldimethylammonium chloride solution (5% active ingredient) was added to the reaction mixture all at once. Five additions each of 0.04 part of a diisopropylbenzene hydroperoxide solution (50% active ingredient), 0.04 part of a diisobutylphenoxyethoxyethylbenzyldimethylammonium chloride solution (5% active ingredient) in 10.0 parts of oil were made at 2.67, 3.33, 4.00, 4.67 and 5.33 hours. At 6.0 hours, 50 parts of oil was added. The bath temperature was maintained at 119° to 125° C. throughout the polymerization until 6.5 hours when heating was discontinued. The product was a 46.4% solution of copolymer in oil. One percent of this product in an oil test blend dispersed 0.4% asphaltenes at 150° C.

EXAMPLE 18

A mixture was prepared from 15 parts of vinyl laurate, 1 part of toluene, 1.4 parts of a 50% diisopropylbenzene hydroperoxide solution in alcohol and ketone, as furnished commercially, and 1.4 parts of a 5% solution of diisobutylphenoxyethoxyethylbenzyldimethylammonium chloride in n-hexanol. This mixture was charged to a reaction vessel flushed with nitrogen and heated to 100° C. by means of an oil bath. At 2 hours, the vinyl laurate had polymerized to the extent of 81%. A separate monomeric mixture was made up consisting of 5 parts of diethylphosphonoethyl methacrylate, 0.5 part of toluene, 0.7 part of a 50% diisoproplybenzene hydroperoxide solution and 0.7 part of a 5% solution of diisobutylphenoxyethoxyethyldimethylbenzylammonium chloride in n-hexanol. This monomeric mixture was charged to the reaction vessel containing the polyvinyl laurate and monomer beginning at 2 hours. At 160, 200, 240, 280 and 320 minutes, respectively, 0.7 part of 50% solution of diisopropylbenzene hydroperoxide and 0.7 part of the 5% n-hexanol solution of diisobutylphenoxyethoxyethyldimethylbenzylammonium chloride in 1 part of toluene were added. At 360 minutes, heating and stirring were stopped. The product was a 44.9% solution of copolymer in toluene. At 100° F., a toluene solution adjusted to 30% copolymer gas a viscosity of 15 cs.

A blend in oil of 0.063% of this product dispersed 0.4% of asphaltenes at 90° C.

EXAMPLE 19

In the same manner as in the previous examples, polymerization was started with 60 parts of di(cetyl-stearyl) itaconate and 15 parts of lauryl-myristyl methacrylate in toluene at 100° to 105° C. After 2 hours of polymerization, there was slowly added 25 parts of diethylphosphonoethyl methacrylate together with additional initiator (diisopropylbenzene hydroxide) and the quaternary ammonium salt. At 6 hours, the yield of copolymer was 70% and the product was a 31.7% solution of copolymer. It had a viscosity of 410 cs. at 100° F. A 1% blend in oil of this product readily dispersed 0.4% of asphaltenes at 90° C.

What is claimed is:
1. A composition comprising a lubricating oil or fuel having dissolved therein a sufficient amount of product to impart dispersancy activity, said product being prepared by (1) first polymerizing under the influence of a free radical polymerization initiator at least one polymerizable monovinylidene compound until 40% to about 90% thereof has polymerized, whereby a mixture of monomer and polymer is formed, said monomer being selected from at least one member of alkyl esters of acrylic, methacrylic and itaconic acids, vinyl esters of alkanoic acids or mixtures of said esters, the average size of alkyl group in said esters being sufficiently large to impart solubility of the copolymers in hydrocarbon oils and being at least 8 carbon atoms, (2) then adding to said mixture at least one phosphorus containing ester from the compounds of the formulas

I 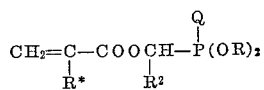

II 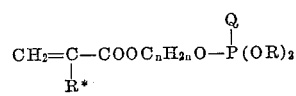

III 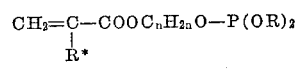

or

IV 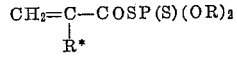

the phosphorus-containing ester being about 3% to about 35% of the total weight of monomers,
wherein
R* represents hydrogen or methyl,
R represents alkyl of 1 to 8 carbon atoms,
R² represents hydrogen or alkyl of 1 to 7 carbon atoms,
Q represents oxygen or sulfur and
n represents an integer of 2 to 3 and
(3) copolymerizing the resulting mixture under the influence of a free radical polymerization initiator.

2. A composition according to claim 1 comprising a lubricating oil.

3. A composition according to claim 1 comprising a fuel.

4. A composition according to claim 1 wherein said monomer is polymerized with a minor proportion of at least one member of acrylic acid, methacrylic acid, itaconic acid, maleic anhydride, maleic half esters, maleic half amides, dialkyl maleates, dialkyl fumarates, vinyl alkyl ethers, acrylonitrile, methacrylonitrile or acrylamides.

5. A composition according to claim 1 wherein there is employed in the starting monomer a mixture of alkyl methacrylates having 12 to 18 carbon atoms in said alkyl portion.

6. A composition according to claim 1 wherein said phosphorus-containing ester is diethylphosphatoethyl methacrylate.

7. A composition according to claim 1 wherein said phosphorus-containing ester is diethylphosphonoethyl methacrylate.

8. A composition according to claim 1 wherein said phosphorus-containing ester is employed in the amount of about 15% to 30% by weight of the total weight of monomers used.

References Cited

UNITED STATES PATENTS 3,030,347   4/1962   O'Brien _____ 252—49.8

DANIEL E. WYMAN, *Primary Examiner.*

L. G. XIARHOS, W. H. CANNON, *Assistant Examiners.*